US005835689A

United States Patent [19]
Braun et al.

[11] Patent Number: 5,835,689

[45] Date of Patent: Nov. 10, 1998

[54] TRANSACTION EVIDENCING SYSTEM AND METHOD INCLUDING POST PRINTING AND BATCH PROCESSING

[75] Inventors: John F. Braun, Weston; Robert A. Cordery, Danbury; Leon A. Pintsov, West Hartford, all of Conn.

[73] Assignee: Pitney Bowes Inc., Stamford, Conn.

[21] Appl. No.: 575,104

[22] Filed: Dec. 19, 1995

[51] Int. Cl.[6] .......................... B41B 15/00; G09C 3/08; G01T 31/00

[52] U.S. Cl. ...................... 395/113; 380/51; 364/479.01; 364/479.03; 705/401; 705/405

[58] Field of Search .................................. 395/112, 113, 395/114, 117; 235/375, 380, 487, 492, 381; 902/25, 26; 364/479.01, 479.02, 479.03; 380/51; 705/401, 405, 408

[56] References Cited

U.S. PATENT DOCUMENTS

| | | | |
|---|---|---|---|
| 4,575,621 | 3/1986 | Dreifus | 235/380 |
| 4,725,718 | 2/1988 | Sansone et al. | 235/495 |
| 4,731,842 | 3/1988 | Smith | 380/24 |
| 4,757,537 | 7/1988 | Edelman et al. | 380/51 |
| 4,774,500 | 9/1988 | Lichty | 341/95 |
| 4,775,246 | 10/1988 | Edelman et al. | 380/23 |
| 4,802,218 | 1/1989 | Wright et al. | 380/23 |
| 4,809,185 | 2/1989 | Talmadge | 364/464.02 |
| 4,809,326 | 2/1989 | Shigenaga | 380/23 |
| 4,813,912 | 3/1989 | Chickneas | 364/464.02 |
| 4,831,555 | 5/1989 | Sansone et al. | 364/519 |
| 4,864,618 | 9/1989 | Wright et al. | 380/51 |
| 4,873,645 | 10/1989 | Hunter et al. | 364/479 |
| 4,910,393 | 3/1990 | Gercekci et al. | 235/380 |
| 4,980,542 | 12/1990 | Jackson et al. | 235/375 |
| 4,985,920 | 1/1991 | Seki | 380/23 |
| 5,039,850 | 8/1991 | Yamaguchi | 235/492 |
| 5,150,408 | 9/1992 | Bright | 380/21 |
| 5,173,862 | 12/1992 | Fedirchuk et al. | 364/464.02 |
| 5,175,424 | 12/1992 | Lisimaque | 235/492 |
| 5,197,055 | 3/1993 | Hartung et al. | 369/34 |
| 5,200,903 | 4/1993 | Gilham | 364/464.02 |
| 5,224,046 | 6/1993 | Kim et al. | 235/375 |
| 5,229,768 | 7/1993 | Thomas | 341/51 |
| 5,243,175 | 9/1993 | Kato | 235/435 |
| 5,257,197 | 10/1993 | Gunther | 364/464.02 |
| 5,283,828 | 2/1994 | Saunders et al. | 380/4 |
| 5,293,424 | 3/1994 | Hotley | 380/23 |
| 5,309,363 | 5/1994 | Graves | 364/464.02 |
| 5,319,562 | 6/1994 | Whitehouse | 364/464.03 |
| 5,365,044 | 11/1994 | Hesshaus | 235/375 |
| 5,369,258 | 11/1994 | Sansone et al. | 235/381 |
| 5,386,516 | 1/1995 | Monahan et al. | 395/275 |
| 5,388,260 | 2/1995 | Monahan et al. | 395/600 |

FOREIGN PATENT DOCUMENTS

| | | | |
|---|---|---|---|
| 0298775 | 7/1988 | European Pat. Off. | G02B 17/02 |
| 0393896 | 4/1990 | European Pat. Off. | G07B 17/02 |
| 0604148 | 12/1993 | European Pat. Off. | G07B 17/00 |

*Primary Examiner*—Kim Yen Vu
*Assistant Examiner*—Kimberly A. Williams
*Attorney, Agent, or Firm*—Charles R. Malandra, Jr.; Melvin J. Scolnick

[57] ABSTRACT

A transaction evidencing system and method includes a host processor and an unsecured printer coupled to the host processor. A vault device that includes digital token generation and transaction accounting functions is operatively coupled to the host processor. The vault device generates a digital token in response to a first command from the host processor. The digital token and information relating thereto are stored in storage area in the vault and/or the host processor. The stored digital token and information relating thereto are selectively accessed for generating transaction evidencing indicia corresponding to the stored digital token. The unsecured printing structure prints the transaction evidencing indicia in response to a second command which is issued at a time subsequent to the first command. A batch of digital tokens may be generated and stored in an indexed file in the storage area before any indicia corresponding to the batch of digital tokens are generated and printed. The host processor may be a personal computer and the vault device may be a portable vault card that is removably coupled to the personal computer. The information related to the digital token is postal information including piece count, postage amount and addressee information and the indexed file is indexed according to addressee information.

9 Claims, 5 Drawing Sheets

TRANSACTION EVIDENCING SYSTEM AND METHOD INCLUDING POST PRINTING AND BATCH PROCESSING

RELATED APPLICATIONS

The present application is related to U.S. Pat. No. 5,590,198; 5,625,694; 5,742,683; 5,781,438; 5,793,867; and U.S. patent application Ser. No. 08/574,746; 08/575,109; 08/575,110; 08/575,111; and 08/575,112, each filed concurrently herewith, and assigned to the assignee of the present invention.

FIELD OF THE INVENTION

The present invention relates generally to value printing systems and, more particularly, to value printing systems wherein a printer is not dedicated to a metering module.

BACKGROUND OF THE INVENTION

The USPS is presently considering requirements for two metering device types: closed systems and open systems. In a closed system, the system functionality is solely dedicated to metering activity. Examples of closed system metering devices, also referred to as postage evidencing devices (PEDs), include conventional digital and analog postage meters wherein a dedicated printer is securely coupled to a metering or accounting function. In a closed system, since the printer is securely coupled and dedicated to the meter, printing cannot take place without accounting. Recently, Pitney Bowes Inc. has introduced the Post Perfect™ meter which is a new closed system metering device that includes a dedicated digital printer securely coupled to a secure accounting module.

In an open system, the printer is not dedicated to the metering activity, freeing system functionality for multiple and diverse uses in addition to the metering activity. Examples of open system metering devices include personal computer (PC) based devices with single/multi-tasking operating systems, multi-user applications and digital printers. An open system metering device is a PED with a non-dedicated printer that is not securely coupled to a secure accounting module.

When a PED prints a postage indicium on a mailpiece, the accounting register within the PED must always reflect that the printing has occurred. Postal authorities generally require the accounting information to be stored within the postage meter in a secure manner with security features that prevent unauthorized and unaccounted for postage printing or changes in the amounts of postal funds stored in the meter. In a closed system, the meter and printer are integral units, i.e., interlocked in such a manner as to ensure that the printing of postage indicia cannot occur without accounting.

Since an open system PED utilizes a printer that is not used exclusively for printing proof of postage payment, additional security measures are required to prevent unauthorized printing evidence of postage payment. Such security measures include cryptographic evidencing of postage payment by PEDs in the open and closed metering systems. The postage value for a mail piece may be encrypted together with other data to generate a digital token. A digital token is encrypted information that authenticates the information imprinted on a mail piece including postage values.

Examples of systems for generating and using digital tokens are described in U.S. Pat. Nos. 4,757,537, 4,831,555, 4,775,246, 4,873,645, and 4,725,718, the entire disclosures of which are hereby incorporated by reference. These systems employ an encryption algorithm to encrypt selected information to generate at least one digital token for each mailpiece. The encryption of the information provides security to prevent altering of the printed information in a manner such that any misuse of the tokens is detectable by appropriate verification procedures.

Typical information which may be encrypted as part of a digital token includes origination postal code, vendor identification, data identifying the PED, piece count, postage amount, date, and, for an open system, destination postal code. These items of information, collectively referred to as Postal Data, when encrypted with a secret key and printed on a mail piece provide a very high level of security which enables the detection of any attempted modification of a postal revenue block or a destination postal code. A postal revenue block is an image printed on a mail piece that includes the digital token used to provide evidence of postage payment. The Postal Data may be printed both in encrypted and unencrypted form in the postal revenue block. Postal Data serves as an input to a Digital Token Transformation which is a cryptographic transformation computation that utilizes a secret key to produce digital tokens. Results of the Digital Token Transformation, i.e., digital tokens, are available only after completion of the Accounting Process.

Digital tokens are utilized in both open and closed metering systems. However, for open metering systems, the non-dedicated printer may be used to print other information in addition to the postal revenue block and may be used in activity other than postage evidencing. In an open system PED, addressee information is included in the Postal Data which is used in the generation of the digital tokens. Such use of the addressee information creates a secure link between the mailpiece and the postal revenue block and allows unambiguous authentication of the mail piece.

In conventional postage metering devices the printing and accounting for postage has been tightly coupled, both in time and proximity. For example accounting and printing takes place at virtually the same time as printing and in the same physically secure housing. Such coupling of the printing and accounting operations provides a high level of security for each transaction.

SUMMARY OF THE INVENTION

It has been discovered that in a PC-based meter system the meter vault can generate open system digital tokens that can be stored for the generation and printing of indicia at a later time. It has been discovered that in the open metering systems the printing and accounting functions can be physically separated because the security is not in the device but in the destination address code in the digital token. The present invention takes advantage of this aspect of the open metering system to provide a system and method for generating one or more batches of addressee related digital tokens, storing them in a file and later generating and printing indicia therefrom at a later time, for example, seconds or days later.

An open metering system comprises a vault, a user interface and printer. In the present invention, the user interface is a standard PC. Users enter or store addresses on their PC. When a user desires to print an envelope, a message is sent to the vault requesting postage for a particular address and date (usually the current date). The vault performs appropriate postal accounting procedures, generates digital tokens and other indicia information and communicates them to the PC. The PC then sends a message to the printer which prints the envelope. This present invention improves this process by storing the information received from the vault in a PC file (in RAM or on disk) for printing at a later time.

The process to generate any number of mailpieces in accordance with the present invention proceeds in much the same manner as described above. A user enters the address or list of addresses (or recall them from a file on disk) and the intended date of submission to the Post (usually defaulting to the current date). The PC then requests postage for all of the entered addresses. The vault performs the appropriate postal accounting procedures, generates digital tokens and the other indicia information and communicates them to the PC. The PC then stores them either in RAM or in non-volatile memory (such as a hard disk). They may then be printed immediately or at anytime in the future. This allows a user to generate tokens and format envelopes which will be mailed at a predetermined future date. The user may then print these envelopes at any time before that date. In addition, the envelope(s) may be previewed by the user prior to printing. At this time the user may change or add any non-postal related information to the envelope. Examples information which may be changed added are: ad slogans, return addresses, tag lines, etc.

In accordance with the present invention, a transaction evidencing system and method includes a host processor and an unsecured printer coupled to the host processor. A vault device that includes digital token generation and transaction accounting functions is operatively coupled to the host processor. The vault device generates a digital token in response to a first command from the host processor. The digital token and information relating thereto are stored in storage area in the vault and/or the host processor. The stored digital token and information relating thereto are selectively accessed for generating a transaction evidencing indicium corresponding to the stored digital token. The unsecured printing structure prints the transaction evidencing indicium in response to a second command which is issued at a time subsequent to the first command. A batch of digital tokens may be generated and stored in an indexed file in the storage area before any indicia corresponding to the batch of digital tokens are generated and printed. The host processor may be a personal computer and the vault device may be a portable vault card that is removably coupled to the personal computer. The information related to the digital token is postal information including piece count, postage amount and addressee information and the indexed file is indexed according to addressee information.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
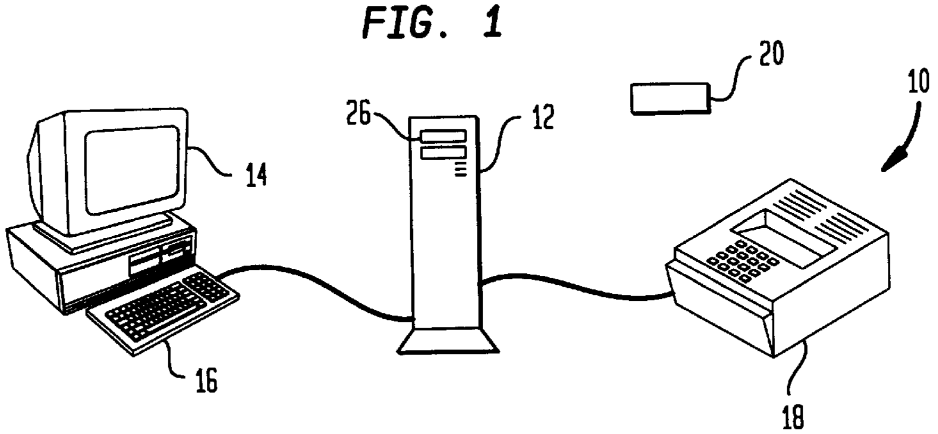
FIG. 1 is a block diagram of a PC-based metering system in accordance with the present invention.

In describing the present invention, reference is made to the drawings, wherein there is seen in FIGS. 1–4 an open system PC-based postage meter, also referred to herein as a PC meter system, generally referred to as 10, in which the present invention performs the digital token process. PC meter system 10 includes a conventional personal computer configured to operate as a host to a removable metering device or electronic vault, generally referred to as 20, in which postage funds are stored. PC meter system 10 uses the personal computer and its printer to print postage on envelopes at the same time it prints a recipient's address or to print labels for pre-addressed return envelopes or large mailpieces. It will be understood that although the preferred embodiment of the present invention is described with regard to a postage metering system, the present invention is applicable to any value metering system that includes a transaction evidencing.

As used herein, the term personal computer is used generically and refers to present and future microprocessing systems with at least one processor operatively coupled to user interface means, such as a display and keyboard, and storage media. The personal computer may be a workstation that is accessible by more than one user.

The PC-based postage meter 10 includes a personal computer (PC) 12, a display 14, a keyboard 16, and an non-secured digital printer 18, preferably a laser or ink-jet printer. PC 12 includes a conventional processor 22, such as the 80486 and Pentium processors manufactured by Intel, and conventional hard drive 24, floppy drive(s) 26, and memory 28. Electronic vault 20, which is housed in a removable card, such as PCMCIA card 30, is a secure encryption device for postage funds management, digital token generation and traditional accounting functions. PC meter system 10 may also include an optional modem 29 which is located preferably in PC 12. Modem 29 may be used for communicating with a Postal Service or a postal authenticating vendor for recharging funds (debit or credit). In an alternate embodiment the modem may be located in PCMCIA card 30.

PC meter system 10 further includes a Windows-based PC software module 34 (FIGS. 3 and 4) that is accessible from conventional Windows-based word processing, database, accounting and spreadsheet application programs 36. PC software module 34 includes a vault dynamic link library (DLL) 40, a user interface module 42 (FIG. 2), and a plurality of sub-modules that control the metering functions. DLL module 40 securely communicates with vault 20 and provides an open interface to Microsoft Windows-based application programs 36 through user interface module 42. DLL module 40 also securely stores an indicia image and a copy of the usage of postal funds of the vault. User interface module 42 provides application programs 36 access to an electronic indicia image from DLL module 40 for printing the postal revenue block on a document, such as an envelope or label. User interface module 42 also provides application programs the capability to initiate remote refills and to perform administrative functions.

Thus, PC-based meter system 10 operates as a conventional personal computer with attached printer that becomes a postage meter upon user request. Printer 18 prints all documents normally printed by a personal computer, including printing letters and addressing envelopes, and in accordance with the present invention, prints postage indicia.

Figure 2:
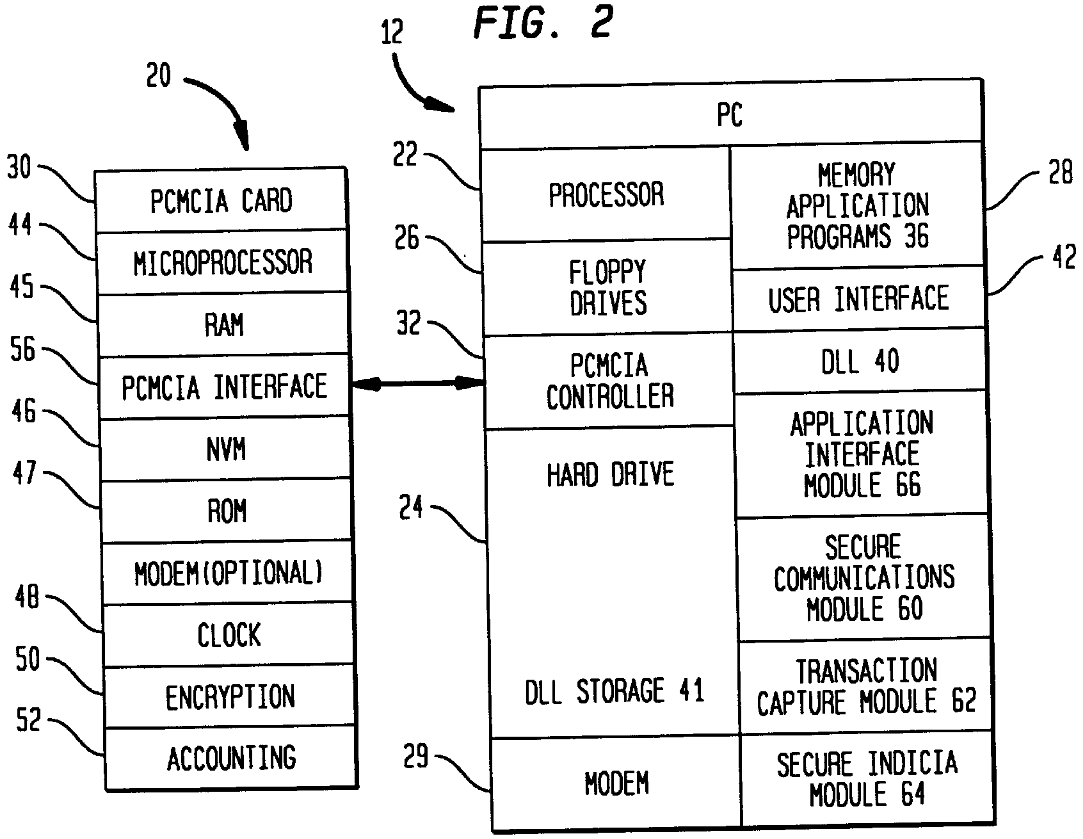
FIG. 2 is a schematic block diagram of the PC-based metering system of FIG. 1 including a removable vault card and a DLL in the PC.
Figure 3:
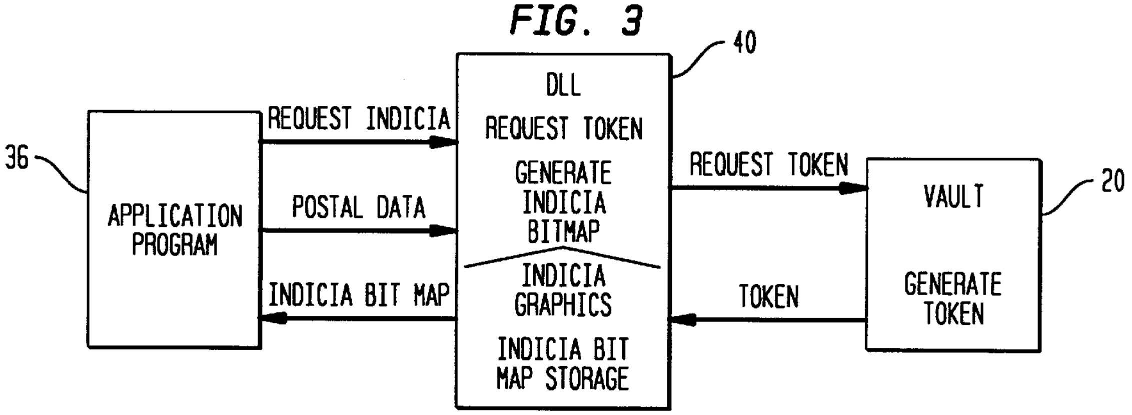
FIG. 3 is a schematic block diagram of the DLL in the PC-based metering system of FIG. 1 including interaction with the vault to generate indicia bitmap.
Figure 4:
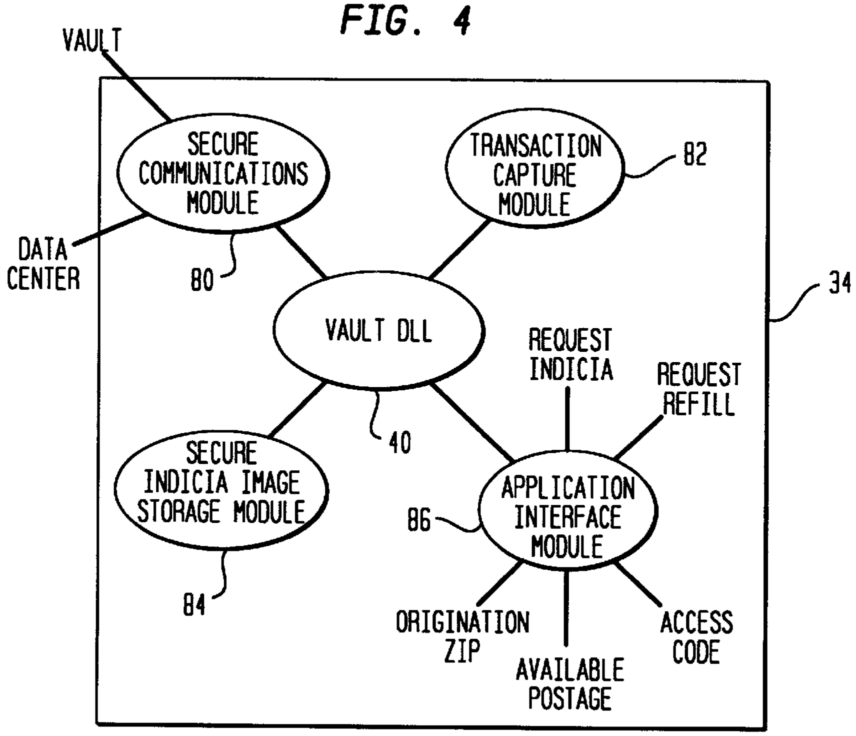
FIG. 4 is a block diagram of the DLL sub-modules in the PC-based metering system of FIG. 1.

The vault is housed in a PCMCIA I/O device, or card, 30 which is accessed through a PCMCIA controller 32 in PC 12. A PCMCIA card is a credit card size peripheral or adapter that conforms to the standard specification of the Personal Computer Memory Card International Association. Referring now to FIGS. 2 and 3, the PCMCIA card 30 includes a microprocessor 44, redundant non-volatile memory (NVM) 46, clock 48, an encryption module 50 and an accounting module 52. The encryption module 50 may implement the NBS Data Encryption Standard (DES) or another suitable encryption scheme. In the preferred embodiment, encryption module 50 is a software module. It will be understood that encryption module 50 could also be a separator device, such as a separate chip connected to microprocessor 44. Accounting module 52 may be EEPROM that incorporates ascending and descending registers as well as Postal Data, such as origination ZIP Code, vendor identification, data identifying the PC-based postage meter 10, sequential piece count of the postal revenue block generated by the PC-based postage meter 10, postage amount and the date of submission to the Postal Service. As is known, an ascending register in a metering unit records the amount of postage that has been dispensed, i.e., issued by the vault, in all transactions and the descending register records the value, i.e., amount of postage, remaining in the metering unit, which value decreases as postage is issued.

The hardware design of the vault includes an interface 56 that communicates with the host processor 22 through PCMCIA controller 32. Preferably, for added physical security, the components of vault 20 that perform the encryption and store the encryption keys (microprocessor 44, ROM 47 and NVM 46) are packaged in the same integrated circuit device/chip that is manufactured to be tamper proof. Such packaging ensures that the contents of NVM 46 may be read only by the encryption processor and are not accessible outside of the integrated circuit device. Alternatively, the entire card 30 could be manufactured to be tamper proof.

The memory of each NVM 46 is organized into sections. Each section contains historical data of previous transactions by vault 20. Examples of the types of transactions include: postage dispensed, tokens issued, refills, configuration parameters, and postal and vendor inspections. The size of each section depends on the number of transactions recorded and the data length of the type of transaction. Each section in turn is divided into transaction records. Within a section, the length of a transaction record is identical. The structure of a transaction record is such that the vault can check the integrity of data.

The functionality of DLL 40 is a key component of PC-base meter 10. DLL 40 includes both executable code and data storage area 41 that is resident in hard drive 24 of PC 12. In a Windows environment, a vast majority of applications programs 36, such as word processing and spreadsheet programs, communicate with one another using one or more dynamic link libraries. PC-base meter 10 encapsulates all the processes involved in metering, and provides an open interface to vault 20 from all Windows-based applications capable of using a dynamic link library. Any application program 36 can communicate with vault microprocessor 44 in PCMCIA card 30 through DLL 40.

DLL 40 includes the following software sub-modules. Secure communications sub-module 80 controls communications between PC 12 and vault 20. Transaction captures sub-module 82 stores transaction records in PC 12. Secure indicia image creation and storage sub-module 84 generates an indicia bitmap image and stores the image for subsequent printing. Application interface sub-module 86 interfaces with non-metering application programs and issues requests for digital tokens in response to requests for indicia by the non-metering application programs. A more detailed description of PC meter system 10 and the generation of digital tokens is provided in previously noted U.S. patent applications Ser. Nos. 08/575112 and 08/575107 which are incorporated herein by reference.

Since printer 18 is not dedicated to the metering function, issued digital tokens may be requested, calculated and stored in PC 12 for use at a later time when, at a user's discretion, indicia corresponding to the issued digital tokens are generated and printed.

When PC-based meter system 10 is operating in a non-batch mode, a request for digital token is received from PC 12, vault 20 calculates and issues at least one digital token to PC 12 in response to the request. The issued digital token is stored as part of a transaction record in PC 12 for printing at a later time. In the preferred embodiment of the present invention, the transaction record is stored in a hidden file in DLL storage area 41 on hard drive 24. Each transaction record is indexed in the hidden file according to addressee information. It has been discovered that this method of issuing and storing digital tokens provides an additional benefit that one or more digital tokens can be reissued from DLL 40 rather than from vault 20 whenever a token has not been printed or if a problem has occurred preventing a printing of an indicia with the token.

Figure 5:
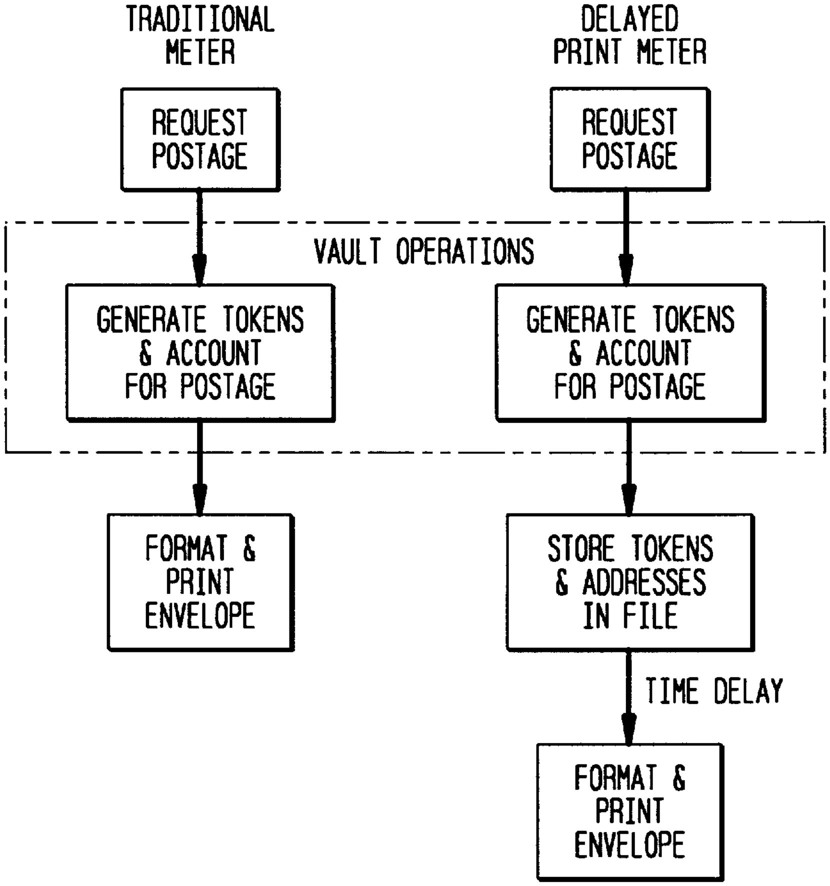
FIG. 5 is a block diagram showing the difference between transaction processing in a conventional postage and the PC-based metering system of FIG. 1.

By storing digital tokens as part of transaction records in PC 12 the digital tokens can be accessed at a later time for the generation and printing of indicia which is done in PC 12. FIG. 5 illustrates differences between conventional meter processing and delayed printing processing of the present invention.

The storage of transaction records that include vault status at the end of each transaction provides a backup to the vault with regard to accounting information as well as a record of issued tokens. The number of transaction records stored on hard drive 24 may be limited to a predetermined number, preferably including all transactions since the last refill of vault 20. In previously noted U.S. Pat. No. 5,793,867, which is incorporated herein by reference, the method of backing up such transactions and recovery therefrom is described.

Figure 6:
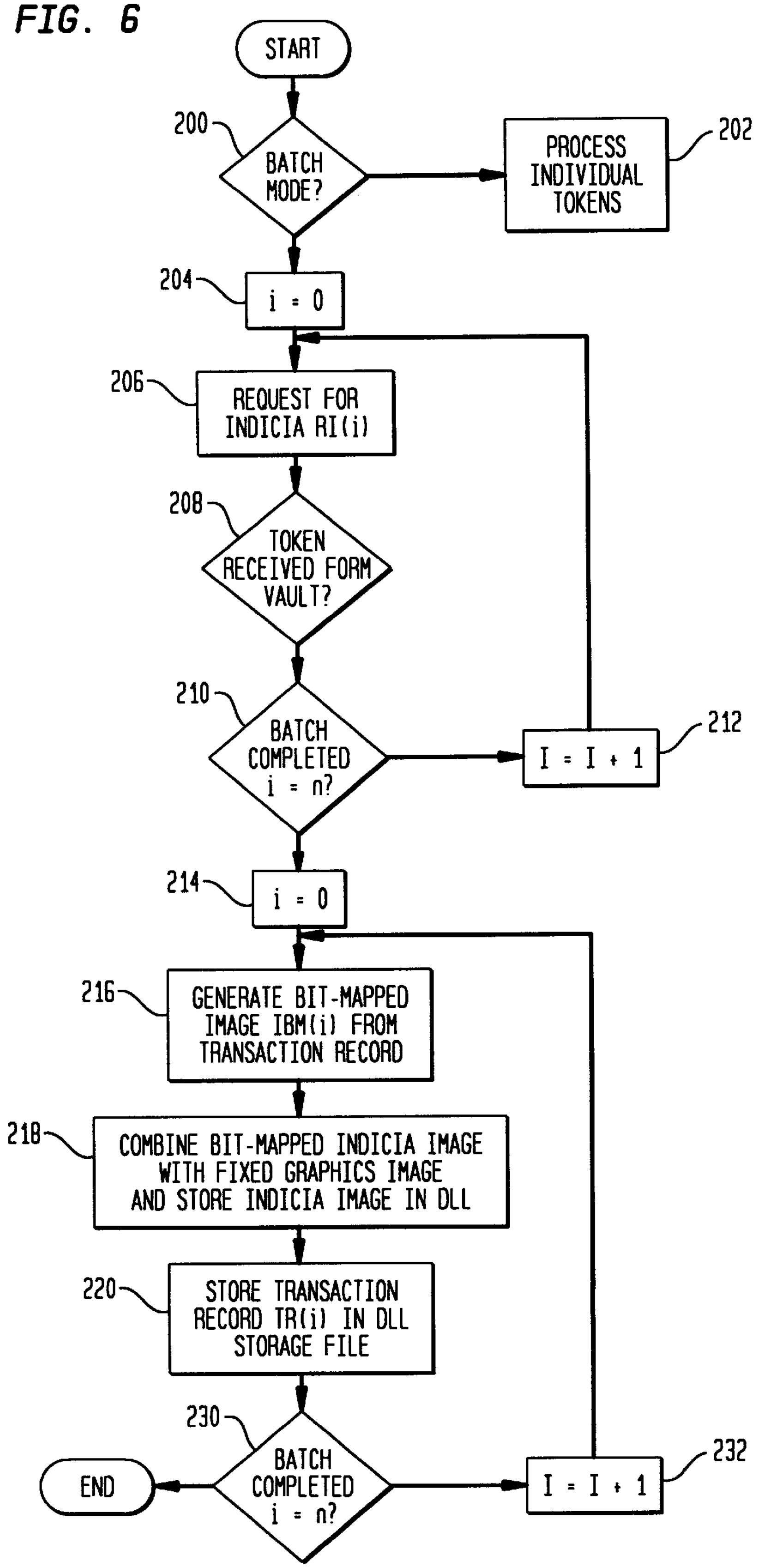
FIG. 6 is a flow chart of the batch processing of digital tokens.

Referring now to FIG. 6, the preferred method of the present invention is shown. At step 200, a check is made to see if PC-based meter 10 is in batch mode. If not then the generation of digital tokens occurs, at step 202, as described in previously noted U.S. Pat. No. 5,781,438. If in batch mode, then, at step 204, the batch index i is set to zero. At step 206, a request for the ith indicia RI(i) is made. At step 208, the process waits for a digital token to be generated in response to the request. When the token, which is part of a transaction record, is received from vault 20, a check is made, at step 210, to determine if the entire batch of n tokens has been received from vault 20. If not, then, at step 212, index i is incremented and the process continues at step 206. If the batch is completed, then, at step 214, a second batch index i is set to zero. At step 216, a bit-mapped image of the ith indicia I(i) is generated from the corresponding transaction record. At step 218, the bit-mapped indicia image is combined with a fixed graphics image and the resulting ith indicia image is stored in DLL 40. At step 220, the ith transaction record TR(i) is stored in DLL storage file 41. Then, at step 230, a check is made to determine if all n indicia of the batch have been generated. If not, then at step 232, the index is incremented and the process continues at step 216.

Figure 7:
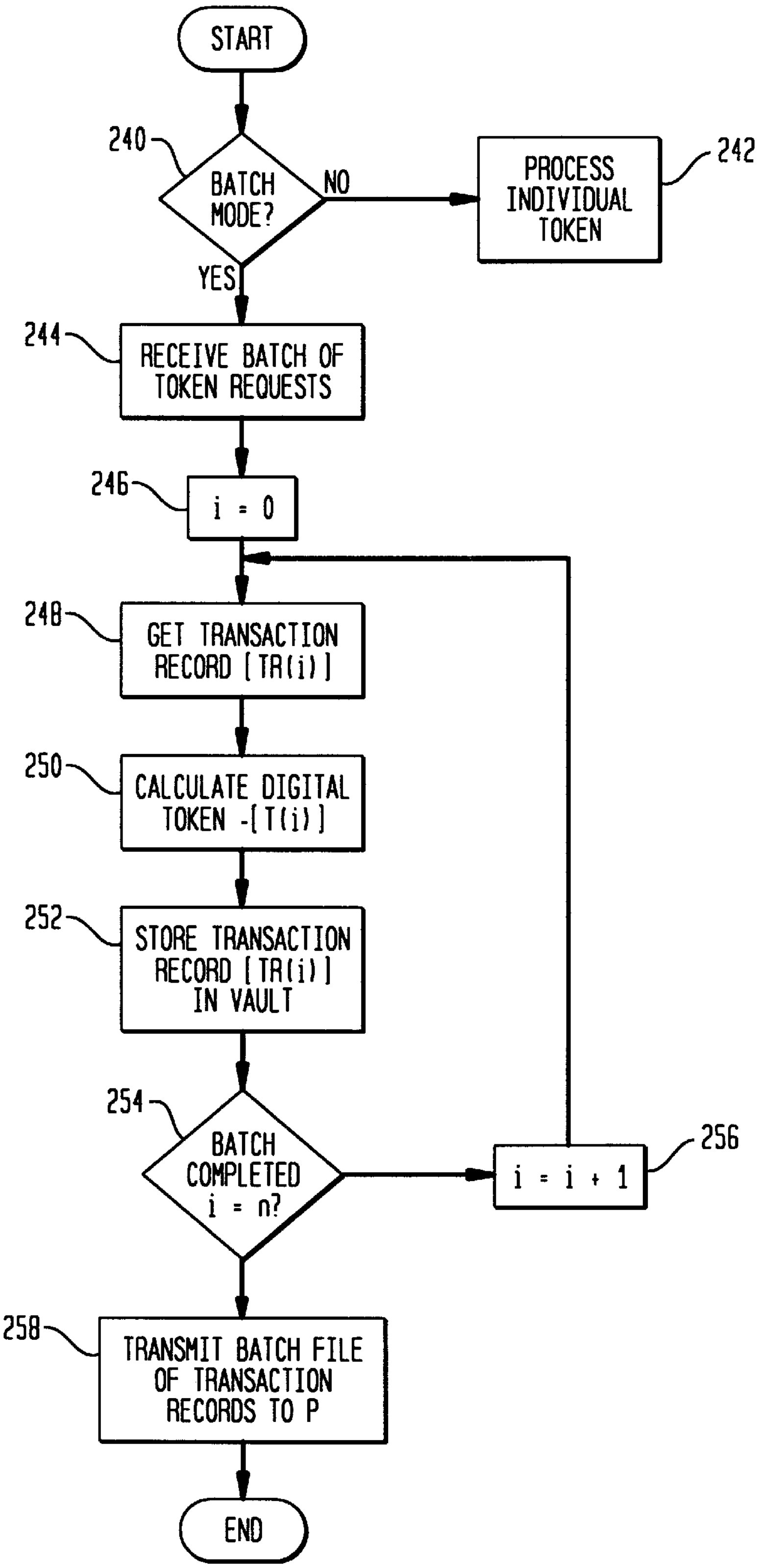
FIG. 7 is a flow chart of an alternate batch processing of digital tokens.

Referring now to FIG. 7, an alternate method is shown in which a batch of digital tokens are issued in vault 20 before being sent to PC 12 as a batch of digital tokens. At step 240, a check is made to see if PC-based meter 10 is in batch mode. If not then the generation of digital tokens occurs, at step 242, as described in previously noted U.S. Pat. No. 5,781,438. If in batch mode, then, at step 244, vault 20 receives a request for a batch of digital tokens. At step 246, index i is set to zero. At step 248, vault 20 reads the postal data relating to the ith transaction requested and at step 250 calculates a digital token T(i) therefor. At step 252, vault 20 stores the transaction record TR(i) in the vault. A check is made, at step 254, to determine if the entire batch of n tokens has been issued by vault 20. If not, the index is incremented at step 256 and the process continues at step 248. If the batch has been completed, then, at step 258, the batch of transaction records are sent to PC 12 for storage and the generation of indicia corresponding to the batch of digital tokens in the transaction records.

While the present invention has been disclosed and described with reference to a single embodiment thereof, it will be apparent, as noted above that variations and modifications may be made therein. It is, thus, intended in the following claims to cover each variation and modification that falls within the true spirit and scope of the present invention.

What is claimed is:

1. A transaction evidencing system, comprising:

a host processor;

unsecured printing means coupled to the host processor;

a vault device operatively coupled to said host processor, said vault device including digital token generation means and transaction accounting means, said digital token generation means generating a digital token in response to a first command from said host processor;

storage means operatively coupled to at least one of said vault device and said host processor for storing said digital token and information relating thereto;

means for selectively accessing said stored digital token and said information relating thereto and for generating transaction evidencing indicia corresponding to such stored digital token, said unsecured printing means printing said transaction evidencing indicia in response to a second command which is issued at a time subsequent to said first command.

2. The system of claim 1 wherein a batch of digital tokens may be generated and stored in an indexed file in said storage means before any indicia corresponding to said batch of digital tokens are generated and printed.

3. The system of claim 1 wherein the host processor is a personal computer and said vault device is a portable vault card that is removably coupled to the personal computer.

4. The system of claim 3 wherein said information related thereto is postal information including piece count, postage amount and addressee information and said indexed file is indexed according to addressee information.

5. A method of printing an indicia separate from generating a digital token in an open metering system, the method comprising the steps of:

providing a host processor operatively coupled to a printer and vault device, said vault device including digital token generation means and postage accounting means;

calculating in the vault device a digital token in response to a request for digital token from the host processor;

storing in the host processor the digital token and information related thereto as a transaction record;

accessing the stored digital token and the information related thereto at a later time when an indicia is to be generated and printed;

generating in the host processor the indicia;

printing the indicia.

6. The method of claim 5 wherein the steps of calculating the digital token and storing the transaction record are repeated for each request in a batch of requests for digital token before each of the remaining steps is repeated sequentially for each digital token in the batch of digital tokens generated and stored.

7. The method of the claim 6, wherein the step of storing each transaction record includes storing to an indexed file.

8. The method of claim 7, wherein said information related thereto is postal information including piece count, postage amount and addressee information and said indexed file is indexed according to addressee information.

9. The method of claim 5, comprising the further step of:

viewing on a display an image of at least a part of a document with the indicia shown thereon before printing the document.

* * * * *